(12) United States Patent
Shishido

(10) Patent No.: US 7,594,692 B2
(45) Date of Patent: Sep. 29, 2009

(54) FRONT VEHICLE BODY STRUCTURE

(75) Inventor: Tomoki Shishido, Ayase (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 0 days.

(21) Appl. No.: 12/155,081

(22) Filed: May 29, 2008

(65) Prior Publication Data
US 2008/0296934 A1 Dec. 4, 2008

(30) Foreign Application Priority Data
Jun. 1, 2007 (JP) .............. 2007-147212

(51) Int. Cl.
B60J 7/00 (2006.01)

(52) U.S. Cl. .................. 296/203.02; 296/193.06; 296/193.09

(58) Field of Classification Search .............. 296/23.01, 296/203.02, 203.03, 193.05, 193.06, 198, 296/193.09, 187.09, 187.12
See application file for complete search history.

(56) References Cited

U.S. PATENT DOCUMENTS

| 4,886,314 | A | * | 12/1989 | Maeda | 296/192 |
| 6,332,642 | B1 | * | 12/2001 | Hanyu | 296/203.02 |
| 7,267,394 | B1 | * | 9/2007 | Mouch et al. | 296/203.02 |
| 7,296,824 | B2 | * | 11/2007 | Yasui et al. | 280/784 |

FOREIGN PATENT DOCUMENTS

| EP | 0 200 154 A2 | 11/1986 |
| EP | 1 849 685 A1 | 10/2007 |
| JP | 4-349077 A | 12/1992 |
| JP | 2004-338615 A | 12/2004 |
| JP | 2005-153800 A | 6/2005 |

* cited by examiner

Primary Examiner—Joseph D Pape
(74) Attorney, Agent, or Firm—Foley & Lardner LLP

(57) ABSTRACT

A front vehicle body structure including: a hood ridge provided on a side in a vehicle width direction of a front vehicle body; a suspension support member for supporting a suspension of a vehicle, provided on an inner side in the vehicle width direction of the hood ridge; and a concave portion provided on a lower surface of the hood ridge at a location close to the suspension support member.

10 Claims, 5 Drawing Sheets

FRONT VEHICLE BODY STRUCTURE

BACKGROUND OF THE INVENTION

1. Field of the Invention

The present invention relates to a front vehicle body structure having: a hood ridge which constitutes a vehicle body side on a side in a vehicle width direction of a front vehicle body; and a suspension support member located on an inner side in the vehicle width direction of the hood ridge, which supports a suspension and receives an upward load therefrom.

2. Description of the Related Art

Japanese Patent Application Laid-Open Publication No. 4-349077 discloses a front vehicle body structure in which a reinforcing member in a lying Y shape is provided to a front side member (an apron) which constitutes a vehicle body side on a side in a vehicle width direction, and a front suspension holder is formed on an inner side in the vehicle width direction of the front side member.

When the reinforcing member receives an impact load from a front side of the vehicle, the reinforcing member transmits the impact load through a bifurcated portion thereof and a pair of branches extending in two (upper and lower) rearward directions from the bifurcated portion and distributes the impact load to an upper front pillar and to a lower side sill.

SUMMARY OF THE INVENTION

In the above-described front vehicle body structure, the impact load from the front side of the vehicle can be received by the front end of the reinforcing member, transmitted through the bifurcated portion thereof, and be distributed in the two rearward directions. However, the above-described front vehicle body structure is designed without any consideration of an upward load from the front suspension generated when the vehicle is running. In order to counteract the upward load, a separate member may be provided to the front vehicle body structure. However, in this case, an absorption characteristic for the impact load from the front side of the vehicle becomes degraded.

An object of the present invention is to provide a front vehicle body structure which is capable of counteracting an upward load from a suspension when a vehicle is running, while ensuring an absorption characteristic for an impact load from a front side the vehicle.

An aspect of the present invention is a front vehicle body structure including: a hood ridge provided on a side in a vehicle width direction of a front vehicle body; a suspension support member for supporting a suspension of a vehicle, provided on an inner side in the vehicle width direction of the hood ridge; and a concave portion provided on a lower surface of the hood ridge at a location close to the suspension support member.

BRIEF DESCRIPTION OF THE DRAWINGS

The invention will now be described with reference to the accompanying drawings wherein.

DESCRIPTION OF THE PREFERRED EMBODIMENT

Figure 1:
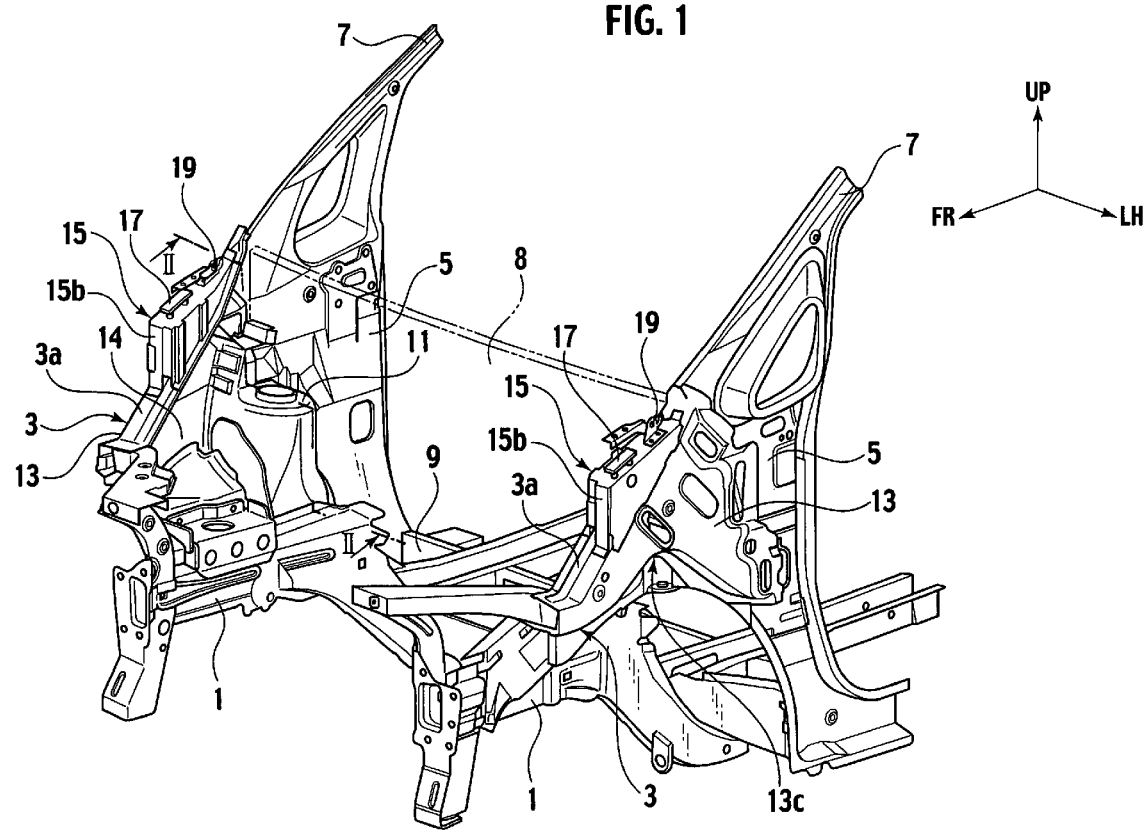
FIG. 1 is a perspective view showing a front vehicle body structure according to an embodiment of the present invention.

Now, an embodiment of the present invention will be described below with reference to the accompanying drawings. In the drawings, an arrow FR indicates a direction to a front side in a longitudinal direction of a vehicle body, or a vehicle body front side (hereinafter simply referred to as a front side when appropriate), an arrow UP indicates a direction to an upside of the vehicle body (hereinafter simply referred to as an upside when appropriate), and an arrow LH indicates a direction to a left side in a vehicle width direction, or a vehicle body left direction.

In the vehicle front body structure in FIG. 1 according to the embodiment of the present invention, a pair of side members 1 are provided to extend in the longitudinal direction of the vehicle body on lower parts of the vehicle front body on both sides in the vehicle width direction thereof. Hood ridges 3 are provided above the respective side members 1 and constitute vehicle body sides of the vehicle front body, respectively. Dash side panels 5 are provided in an upright position on rear sides of the respective hood ridges 3. Front pillars 7 are connected to upper ends of the dash side panels 5. A dash panel 8 is provided to extend in the vehicle width direction between the right and left dash side panels 5. The dash panel 8 partitions a space inside the vehicle body into a vehicle interior and a region in front of the vehicle interior. Moreover, a cross member 9 is provided on a front lower part of the dash panel 8 to join the right and left side members 1 together.

Strut towers 11 serving as suspension support members are fixed to inner sides in the vehicle width direction of the respective hood ridges 3. A lower part of each strut tower 11 is connected to the corresponding side member 1.

Each of the hood ridges 3 has a closed cross-sectional structure including a hood ridge outer 13 located at an outer side in the vehicle width direction and a hood ridge inner 14 located at an inner side in the vehicle width direction and joined to the hood ridge outer 13. An upper front edge of each of the hood ridges 3 has an inclined surface 3a inclined so as to form an aligned smooth continuous surface with the inclined front surface of the front pillar 7. In other words, the inclined surface 3a has almost the same angle of inclination as the angle of inclination of the front pillar 7.

Figure 2:
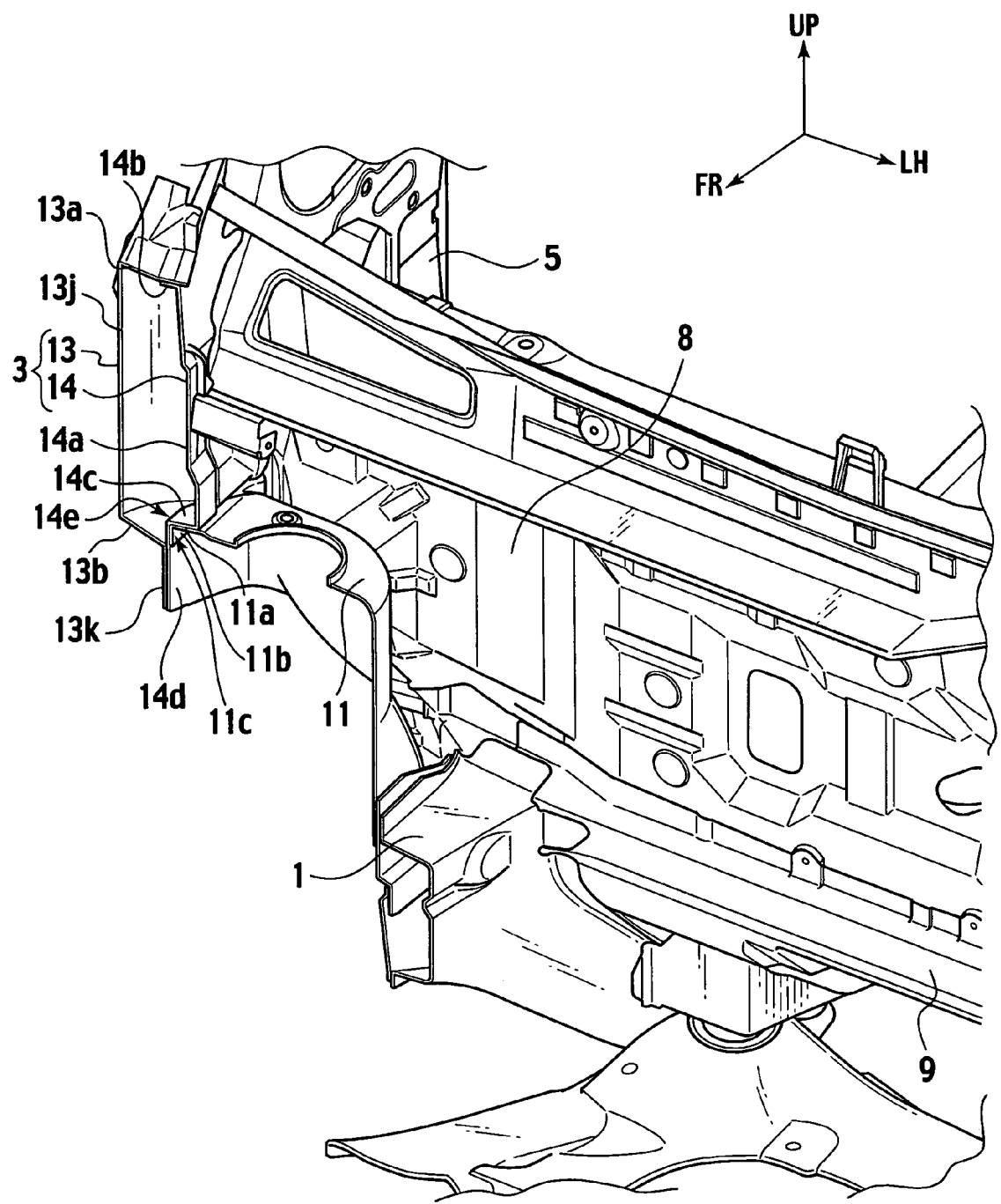
FIG. 2 is a cross-sectional view taken along the II-II line in FIG. 1.

As shown in FIG. 2 that represents the cross-sectional view taken along the II-II line in FIG. 1, each of the hood ridge outers 13 includes: an upper surface wall 13a that corresponds to the inclined surface 3a; a lower surface wall 13b located below the upper surface wall 13a and opposed to the upper surface wall 13a; an outer side surface wall 13j extending in a vertical direction so as to connect outer end edges in the vehicle width direction of the upper surface wall 13a and the lower surface wall 13b to each other; and a lower outer-side joining flange 13k extending downward from an inner end edge in the vehicle width direction of the lower surface wall 13b.

Meanwhile, each of the hood ridge inners 14 includes: an inner side surface wall 14a opposed to the outer-side surface wall 13j of the hood ridge outer 13; an upper joining flange part 14b which is bent outward in the vehicle width direction from an upper end edge of the inner side surface wall 14a and which is joined to a lower surface of the upper surface wall 13a of the hood ridge outer 13; a strut receiving surface 14c which is bent outward in the vehicle width direction from a lower end edge of the inner side surface wall 14a; and a lower inner-side joining flange 14d extending downward from an outer end edge in the vehicle width direction of the strut receiving surface 14c and being joined to the lower outer-side joining flange 13k.

The lower inner-side joining flange 14d is formed longer than the lower outer-side joining flange 13k. An upper end of the lower inner-side joining flange 14d protrudes slightly more upward than that of the lower outer-side joining flange 13k, and thereby forms a corner part 14e together with the strut receiving surface 14c. To the inside of this corner part 14e, an outer corner part 11c located at the outer side in the vehicle width direction on an upper end of the strut tower 11 is fitted to be joined and fixed thereto. That is, a partial upper surface 11a located at an outer side in the vehicle width direction of the strut tower 11 is joined to a lower surface of the strut receiving surface 14c of the hood ridge inner 14, while an outer side bent part 11b extending downward from an outer end in the vehicle width direction of the partial upper surface 11a is joined to the lower inner-side joining flange 14d.

Figure 3:
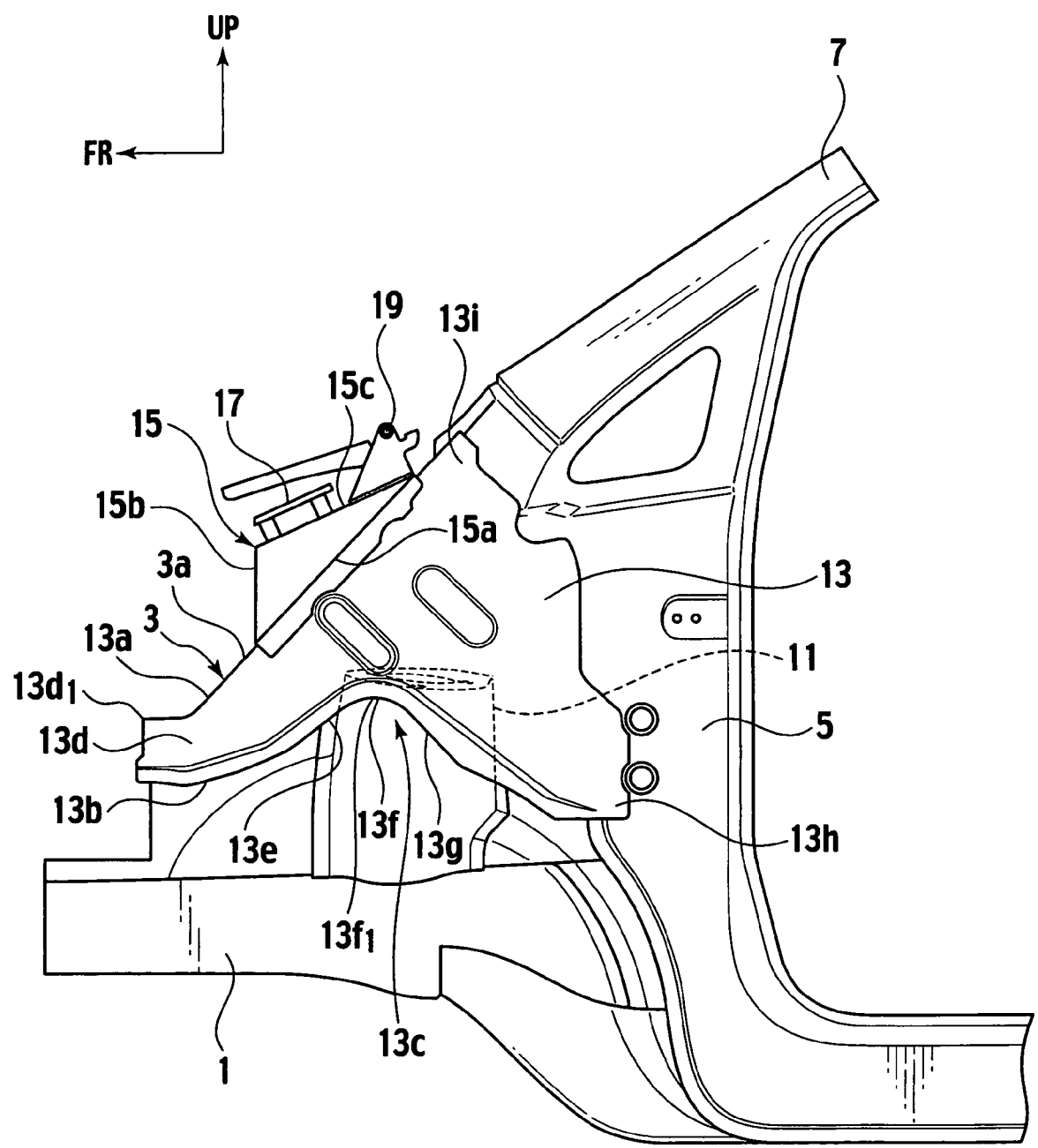
FIG. 3 is a side view of the front vehicle body structure shown in FIG. 1.

Moreover, as shown in a side view in FIG. 3, each of the hood ridge outers 13 includes a concave portion 13c located almost in the center in the longitudinal direction of the vehicle body of the lower surface wall 13b, which is located close to the strut tower 11. The concave portion 13c principally includes a front inclined surface 13e, a concave curved surface 13f, and a rear inclined surface 13g. The front inclined surface extends rearward and upward as it extends in the rearward direction from a front end 13d in the longitudinal direction of the vehicle body of the hood ridge outer 13. A front end of the concave curved surface 13f is connected to an upper end of the front inclined surface 13e. The rear inclined surface 13g is connected to a rear end of the concave curved surface 13f and extends rearward and downward as it extends in the rearward direction from the rear end of the concave curved surface 13f. The concave curved surface 13f forms the smoothly continuous lower surface wall 13b together with the front inclined surface 13e and the rear inclined surface 13g connected thereto. In this embodiment, an upper end of the concave curved surface 13f (a point $13f_1$ in FIG. 3) is located higher than the upper surface wall 13a on a tip end of the front end 13d (a point $13d_1$ in FIG. 3). Meanwhile, the rear inclined surface 13g is inclined so as to form an aligned smooth continuous edge with a front lower part of the dash side panel 5 located behind the hood ridge 3.

Moreover, the hood ridge outer 13 has a continuous shape including a rear lower end 13h located further rearward from the rear inclined surface 13g, an upper end 13i of the above-mentioned upper surface wall 13a, and a vertical wall extending therebetween. Although the hood ridge outer 13 includes the concave portion 13c on a lower edge thereof, the hood ridge outer 13 forms a substantially triangular shape from a side view. That is, the dimension in the vertical direction of the hood ridge outer 13 gradually increases with the distance in the rearward direction increasing from a location of the concave curved surface 13f of the concave portion 13c. Moreover, in this embodiment, a lower end of the rear lower end 13h is located slightly lower than that of the front end 13d. Meanwhile, the rear lower end 13h, the upper end 13i, and the vertical wall therebetween are joined to the dash side panel 5.

Moreover, a hood ridge extension 15 serving as a reinforcing member is mounted on a region located almost immediately above the concave portion 13c on the inclined surface 3a of each of the hood ridges 3 (the upper surface wall 13a of each of the hood ridge outer 13). The hood ridge extension 15 includes: an inclined joint portion 15a to be joined to the hood ridge 3 along the inclined surface 3a; a load receiving surface 15b serving as a load receiving portion extending upward from a lower end of the inclined joint portion 15a substantially in the vertical direction; and a component mounting surface 15c extending rearward from an upper end of the load receiving surface 15b so as to be connected to an upper end of the inclined joint portion 15a. Further included are an outer side surface for connecting the inclined joint portion 15a, the load receiving surface 15b, and an outer end edge in the vehicle width direction of the component mounting surface 15c together on the outer side in the vehicle width direction, and an inner side surface for connecting the inclined joint portion 15a, the load receiving surface 15b, and an inner end edge in the vehicle width direction of the component mounting surface 15c together on the inner side in the vehicle width direction.

The component mounting surface 15c has a gentle inclination which is close to a horizontal plane as compared to the inclined surface 3a, or has an angle of inclination smaller that of inclined surface 3a. On this component mounting surface 15c, a fender bracket 17 for fixing an upper part of an unillustrated front fender is mounted on a front side thereof while a hood hinge 19 serving as a hood supporting member for rotatably supporting an unillustrated hood to open and close the hood is mounted on a rear side thereof.

That is, the fender bracket 17 and the hood hinge 19 constitute separate vehicle body components, so that the hood ridge extension 15 on which these vehicle body components are mounted constitutes a component mounting member.

In the above-described front vehicle body structure, the strut tower 11 receives an upward load from an unillustrated front suspension, which occurs when the vehicle is running. Then, the upward load is transmitted from the strut tower 11 to the hood ridge 3 through a joint between the outer corner part 11c of the strut tower 11 and the corner part 14e of the hood ridge inner 14.

To be more precise, the above-mentioned upward load is transmitted from the partial upper surface 11a of the strut tower 11 to the entire hood ridge 3 through the strut receiving surface 14c of the hood ridge inner 14. At this time, since the hood ridge outer 13 is formed to have the concave portion 13c located close to the strut tower 11, elastic deformation thereof caused by the upward load can be reduced as compared to a case where the region of the hood ridge at which the load is received, that is, a lower surface (the lower surface wall 13b) of the hood ridge, is formed to have a flat shape. Thereby, high rigidity can be ensured.

Figure 4A:
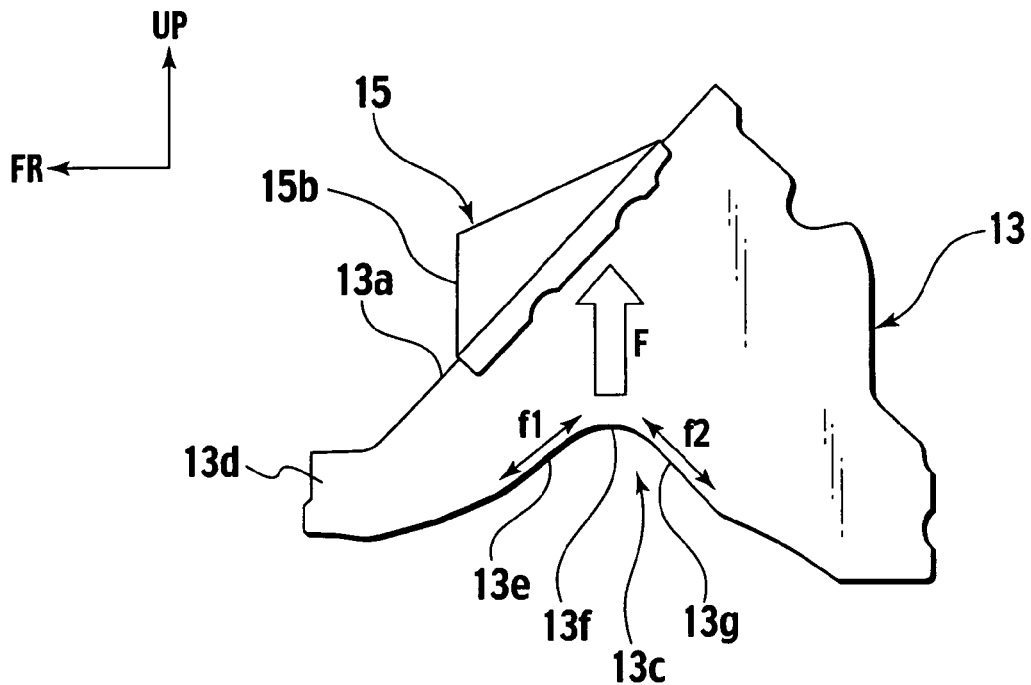
FIG. 4A is a view showing an action of an upward load from a front suspension acting on a hood ridge.

That is to say, as shown in FIG. 4A, when an upward load F from the front suspension acts on the hood ridge outer 13 through the hood ridge inner 14, tensile stresses f1 and f2 (in-plane stresses) are generated on the respective inclined surfaces 13e and 13g in front of and in the rear of the concave portion 13c in the directions along the inclinations thereof. The tensile stresses f1 and f2 collectively counteract the upward load F. These tensile stresses f1 and f2 are smaller than stresses generated in the case where the region of the hood ridge at which the load is received is flat. Accordingly, it is possible to suppress elastic deformation of the vehicle body components located around this region such as the hood ridge 3.

Here, the generated tensile stresses f1 and f2 can effectively counteract the upward load F, since the front and rear inclined surfaces 13e and 13g, particularly regions thereof in the vicinity of the concave curved surface 13f, are formed into flat shapes (straight shapes in the side view).

Figure 4B:
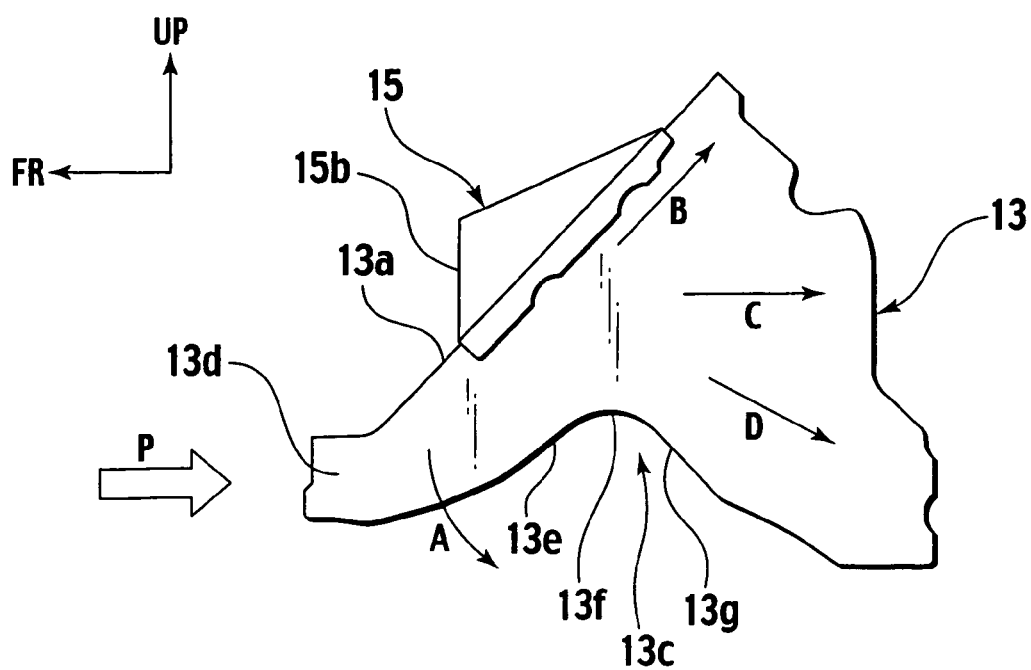
FIG. 4B is a view showing an action of an impact load from a front side of the vehicle acting on the hood ridge.

Meanwhile, when the hood ridge 3 receives an impact load P from the front side of the vehicle in the event of a frontal collision thereof, for example, the hood ridge outer 13 receives the impact load at the front end 13d thereof, and then deforms such that the front end 13d thereof is buckled, crushed, and deforms to be bent so as to rotate downward around a point in the vicinity of the concave curved surface 13f of the concave portion 13c, as indicated with the arrow A in FIG. 4B. The impact is thereby effectively absorbed.

Figure 4C:
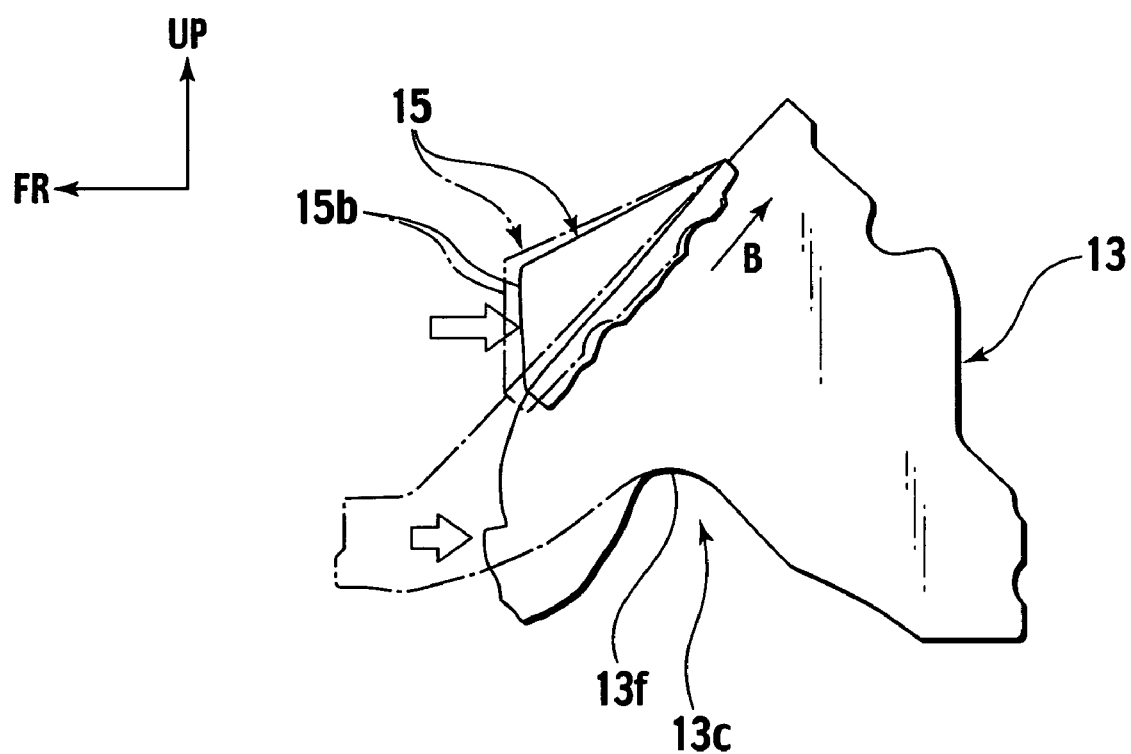
FIG. 4C is a view showing an action of a load acting on a hood ridge extension after the hood ridge starts bending and is deformed by application of the impact load from the front side of the vehicle.

At this time, as shown in FIG. 4C, the hood ridge extension 15 provided on the upper surface wall 13a suppresses excessive downward bending-deformation of the front end 13d of the hood ridge outer 13, while the load receiving surface 15b thereof directly receives part of the frontal impact load and absorbs the impact load by transmitting the impact load in an upward and rearward direction, as indicated with the arrow B in FIG. 4C, after the hood ridge outer 13 is buckled, crushed, and deforms to be bent as described above. That is, the hood ridge extension 15 serving as the reinforcing member counteracts the downward displacement of the food ridge front end 13d caused or induced by the concave portion 13c, when the hood ridge 3 receives the impact load from the front side of the vehicle. In other words, the hood ridge extension 15 generates a moment to block the downward displacement of the food ridge front end 13d.

Here, rearward transmission of the impact load P is efficiently achieved by setting the load receiving surface 15b to face in the direction in which the impact load P is inputted, i.e. by forming the hood ridge extension 15 with the load receiving surface 15b having a direction of a normal line substantially parallel to the direction of the impact load P.

At this time, the vertical dimension of the hood ridge outer 13 gradually increases with increasing distance rearward from the position of the concave portion 13c. Therefore, the impact load P is distributed over the entire width range in the vertical direction of the hood ridge outer 13 not only in the above-mentioned B direction but also in a C direction indicated in a rear section, in a D direction indicated in a rear lower section, and so forth. The impact load P is thereby transmitted to the front pillar located on the upper rear side of the hood ridge 3 and to the side sill located on the lower rear side of the hood ridge 3. Accordingly, the impact can be absorbed very efficiently.

Moreover, the above-described hood ridge extension 15 also serves as the component mounting member on which the separate vehicle body components, including the fender bracket 17 and the hood hinge 19, are mounted. Accordingly, the number of components can be reduced to simplify the structure, as compared to a case of providing another dedicated reinforcing member.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2007-147212, filed on Jun. 1, 2007, the disclosures of which is expressly incorporated herein by reference in its entirety.

What is claimed is:

1. A front vehicle body structure comprising:
a hood ridge provided on a side in a vehicle width direction of a front vehicle body;
a dash side panel located in the rear of the hood ridge;
a front pillar located above the dash side panel; and
a suspension support member for supporting a suspension of a vehicle, provided on an inner side in the vehicle width direction of the hood ridge;
wherein the hood ridge has a closed cross-section comprising an upper wall, a lower wall, and side walls joined to the upper and lower walls, the upper wall comprising an upper inclined edge of the hood ridge, aligned with a front upper edge of the front pillar to form a smooth continuous edge with the front upper edge of the front pillar, the lower wall comprising a lower inclined edge of the hood ridge, aligned with a front lower edge of the dash side panel to form a smooth continuous edge with the front lower edge of the dash side panel,
wherein the hood ridge includes a concave portion having a concave curved surface formed on a lower surface of the lower wall at a location close to the suspension support member and in front of and immediately adjacent to the lower inclined edge,
wherein the hood ridge has a rear lower end and a forwardly projecting front end with an upper end and a lower end, and the concave curved surface of the concave portion has an upper end, wherein the upper end of the concave curved surface of the concave portion has a higher location than the upper end of the front end of the hood ridge, and the rear lower end of the hood ridge has a lower location than the lower end of the front end of the hood ridge.

2. The front vehicle body structure according to claim 1, further comprising:
a reinforcing member provided on the hood ridge at a location substantially above the concave portion.

3. The front vehicle body structure according to claim 2, wherein the reinforcing member counteracts downward displacement of a front end of the hood ridge caused by the concave portion when the hood ridge receives an impact load from a front side of the front vehicle body.

4. The front vehicle body structure according to claim 2, further comprising:
a load receiving portion located on a front side of the reinforcing member and configured to receive an impact load from a front side of the front vehicle body.

5. The front vehicle body structure according to claim 4, wherein the load receiving portion comprises a load receiving surface facing in a direction of the impact load.

6. The front vehicle body structure according to claim 2, wherein the reinforcing member is formed of a component mounting member on which a separate vehicle body component is mounted.

7. The front vehicle body structure according to claim 6, wherein the separate vehicle body component is a fender bracket on which an upper part of a front fender is mounted.

8. The front vehicle body structure according to claim 6, wherein the separate vehicle body component is a hood supporting member configured to support a hood openably and closably.

9. The front vehicle body structure according to claim 1, wherein the hood ridge has a vertical dimension which gradually increases with increasing distance rearward from the concave portion.

10. A front vehicle body structure comprising:

a hood ridge provided on a side in a vehicle width direction of a front vehicle body;

a dash side panel located in the rear of the hood ridge;

a front pillar located above the dash side panel; and a suspension support member for supporting a suspension of a vehicle, provided on an inner side in the vehicle width direction of the hood ridge;

wherein the hood ridge has a closed cross-section comprising an upper wall, a lower wall, and side walls joined to the upper and lower walls, the upper wall comprising an upper inclined edge of the hood ridge, aligned with a front upper edge of the front pillar to form a smooth continuous edge with the front upper edge of the front pillar, the lower wall comprising a lower inclined edge of the hood ridge, aligned with a front lower edge of the dash side panel to form a smooth continuous edge with the front lower edge of the dash side panel, wherein the hood ridge includes a concave portion formed on a lower surface of the lower wall at a location close to the suspension support member, wherein the concave portion includes a rearwardly and upwardly extending front inclined surface, a concave curved surface connected at a front end of the concave portion to an upper end of the front inclined surface, and a rearwardly and downwardly extending rear inclined surface connected to a rear end of the concave curved surface, the rear inclined surface forming a part of the lower inclined edge of the hood ridge, wherein the front and rear inclined surfaces include regions formed into flat shapes, wherein the hood ridge has a rear lower end and a forwardly projecting front end, wherein the rear lower end of the hood ridge has a lower location than a lower end of the front end of the hood ridge.

* * * * *